US012615068B2

(12) United States Patent
Lind

(10) Patent No.: US 12,615,068 B2
(45) Date of Patent: Apr. 28, 2026

(54) MEANS AND METHOD FOR MICROWAVE RADIO TRANSCEIVER CONTROL

(71) Applicant: Telefonaktiebolaget LM Ericsson (PUBL), Stockholm (SE)

(72) Inventor: Karl-Axel Lind, Mölndal (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 773 days.

(21) Appl. No.: 17/791,656

(22) PCT Filed: Jan. 27, 2020

(86) PCT No.: PCT/SE2020/050063
§ 371 (c)(1),
(2) Date: Jul. 8, 2022

(87) PCT Pub. No.: WO2021/154127
PCT Pub. Date: Aug. 5, 2021

(65) Prior Publication Data
US 2023/0038210 A1 Feb. 9, 2023

(51) Int. Cl.
*H04B 1/3827* (2015.01)
*H01Q 3/00* (2006.01)
*H04B 1/00* (2006.01)

(52) U.S. Cl.
CPC .......... *H04B 1/3827* (2013.01); *H01Q 3/005* (2013.01); *H04B 1/0053* (2013.01)

(58) Field of Classification Search
CPC ..... H04B 1/3827; H04B 1/0053; H01Q 3/005
See application file for complete search history.

(56) References Cited

U.S. PATENT DOCUMENTS 5,479,409 A * 12/1995 Dupuy ............ H04W 36/00837
370/337
6,009,337 A * 12/1999 Vaisanen .................. H04B 1/38
455/298

(Continued)

FOREIGN PATENT DOCUMENTS

CN 102571242 A 7/2012
CN 104169729 A 11/2014

(Continued)

OTHER PUBLICATIONS

European Search Report issued for Application No. 20916406.0-1206 / 4097877—Sep. 21, 2023.

(Continued)

*Primary Examiner* — Dominic E Rego
(74) *Attorney, Agent, or Firm* — Baker Botts L.L.P.

(57) ABSTRACT

The present disclosure relates to a portable radio controller unit arrangement (1, 1A, 1B, 1C) that comprises an electrical power source (9) that is adapted to provide power to a microwave radio transceiver (3) that comprises a transmitter unit (13) and a receiver unit (15). The microwave radio transceiver (3) is comprised in a microwave link node (4) and is connected to a directive antenna (5) and to a signal cable (2). The radio controller unit arrangement (1) further comprises a user interface unit (8, 21) which is adapted to communicate with the microwave radio transceiver (3) such that the portable radio controller unit arrangement (1, 1A, 1B, 1C) is adapted to enable user control of the microwave radio transceiver (3) via the user interface unit (8).

26 Claims, 3 Drawing Sheets

(56) References Cited

U.S. PATENT DOCUMENTS

| | | | |
|---|---|---|---|
| 6,813,326 B1* | 11/2004 | Miyashita | H04H 20/44 |
| | | | 375/259 |
| 7,139,581 B2* | 11/2006 | Berliner | G01S 13/82 |
| | | | 455/67.11 |
| 7,706,784 B2* | 4/2010 | Weiner | G06Q 20/3224 |
| | | | 455/562.1 |
| RE42,751 E* | 9/2011 | Greeff | G06K 7/0008 |
| | | | 340/505 |
| 8,265,605 B2* | 9/2012 | Marett | G06Q 30/0224 |
| | | | 340/541 |
| 8,692,676 B2* | 4/2014 | Touchton | A01K 27/009 |
| | | | 340/573.3 |
| 9,472,956 B2* | 10/2016 | Michaelis | H04B 10/2589 |
| 10,243,266 B2 | 3/2019 | Lee et al. | |
| 10,382,571 B1* | 8/2019 | Delker | G01S 5/0009 |
| 10,425,773 B1* | 9/2019 | Huberman | G01C 21/206 |
| 10,985,830 B2* | 4/2021 | Pyun | H04B 7/15507 |
| 12,181,600 B2* | 12/2024 | Ryan | G01S 7/285 |
| 2002/0180894 A1* | 12/2002 | Okajima | H04N 21/4622 |
| | | | 348/E5.103 |
| 2004/0096010 A1* | 5/2004 | Koval | H04L 25/4902 |
| | | | 375/222 |
| 2005/0200522 A1 | 9/2005 | Boucher | |
| 2006/0067389 A1* | 3/2006 | Tounai | H04L 1/0003 |
| | | | 375/219 |
| 2007/0247000 A1* | 10/2007 | Fugiel | G01M 17/08 |
| | | | 303/122.08 |
| 2007/0286115 A1* | 12/2007 | Shibuya | H04B 1/44 |
| | | | 370/328 |
| 2008/0011032 A1* | 1/2008 | Groff | E05B 47/026 |
| | | | 70/257 |
| 2008/0234930 A1* | 9/2008 | Cheok | G01S 5/0284 |
| | | | 701/408 |
| 2009/0156135 A1* | 6/2009 | Kamizuma | H04B 1/0082 |
| | | | 455/208 |
| 2010/0142735 A1* | 6/2010 | Yoon | H04S 7/301 |
| | | | 381/303 |
| 2010/0305778 A1* | 12/2010 | Dorneich | G05D 1/0038 |
| | | | 701/2 |
| 2012/0238211 A1 | 9/2012 | Ferris et al. | |
| 2012/0249137 A1* | 10/2012 | Witschey | G01R 33/3875 |
| | | | 324/309 |
| 2013/0049762 A1* | 2/2013 | Ogg | H01M 10/4207 |
| | | | 324/433 |
| 2013/0322568 A1* | 12/2013 | Pais | G06F 1/1698 |
| | | | 375/316 |
| 2014/0274320 A1* | 9/2014 | Nguyen | G07F 17/3239 |
| | | | 463/25 |
| 2015/0094544 A1* | 4/2015 | Spolin | A61B 5/0008 |
| | | | 600/300 |
| 2015/0185430 A1* | 7/2015 | Jin | G02B 6/44265 |
| | | | 174/59 |
| 2015/0263408 A1 | 9/2015 | Hirabe | |
| 2015/0372710 A1* | 12/2015 | Longhurst | H04B 1/0053 |
| | | | 455/78 |
| 2016/0028454 A1* | 1/2016 | Singh | H04W 52/0212 |
| | | | 455/67.11 |
| 2016/0301141 A1* | 10/2016 | Del Castillo | H01Q 11/10 |
| 2017/0047653 A1* | 2/2017 | Runyon | H01Q 3/06 |
| 2017/0069963 A1 | 3/2017 | Wattwood et al. | |
| 2017/0115046 A1* | 4/2017 | Blezard | B65D 81/3813 |
| 2017/0116177 A1* | 4/2017 | Walia | H04M 7/0045 |
| 2017/0140428 A1* | 5/2017 | Chakraborty | G06Q 30/0269 |
| 2017/0179566 A1 | 6/2017 | Hirabe | |
| 2017/0311307 A1 | 10/2017 | Negus et al. | |
| 2017/0364965 A1* | 12/2017 | Kannan | H04L 67/02 |
| 2017/0366214 A1* | 12/2017 | Zhong | H04B 1/3827 |
| 2018/0014759 A1* | 1/2018 | Bechtel | A61B 5/0015 |
| 2018/0115046 A1* | 4/2018 | Wennström | H01Q 1/1228 |
| 2018/0181286 A1* | 6/2018 | McKay | G06F 3/04886 |
| 2018/0193694 A1* | 7/2018 | Bergman | A63B 39/00 |
| 2018/0231667 A1* | 8/2018 | Ye | G01S 13/003 |
| 2019/0055105 A1* | 2/2019 | Benson | B65H 57/12 |
| 2019/0141796 A1* | 5/2019 | Koetz | H05B 6/72 |
| 2019/0200890 A1* | 7/2019 | Toth | B32B 25/08 |
| 2020/0041571 A1* | 2/2020 | Propp | G01R 31/3842 |
| 2020/0113173 A1* | 4/2020 | Rich | A01M 99/00 |
| 2020/0244302 A1* | 7/2020 | Chi | H04B 1/44 |

FOREIGN PATENT DOCUMENTS

| | | |
|---|---|---|
| CN | 107210525 A | 9/2017 |
| CN | 107409367 A | 11/2017 |
| CN | 110518356 A | 11/2019 |
| EP | 1014481 A1 | 6/2000 |
| EP | 2808944 A1 | 12/2014 |
| EP | 3 203 579 A1 | 8/2017 |
| WO | 02 101873 A1 | 12/2002 |
| WO | 2017 040389 A1 | 3/2017 |
| WO | 2019 154503 A1 | 8/2019 |

OTHER PUBLICATIONS

PCT International Search Report issued for International application No. PCT/SE2020/050063—Dec. 11, 2020.

PCT Written Opinion of the International Searching Authority issued for International application No. PCT/SE2020/050063—Dec. 11, 2020.

Sun Meimei, "Development of the Distance-Controller for Digital Satellite Antenna Balcony"—Aug. 15, 2008.

Official Action issued for Application No. 202080094256.7—Sep. 30, 2024.

* cited by examiner

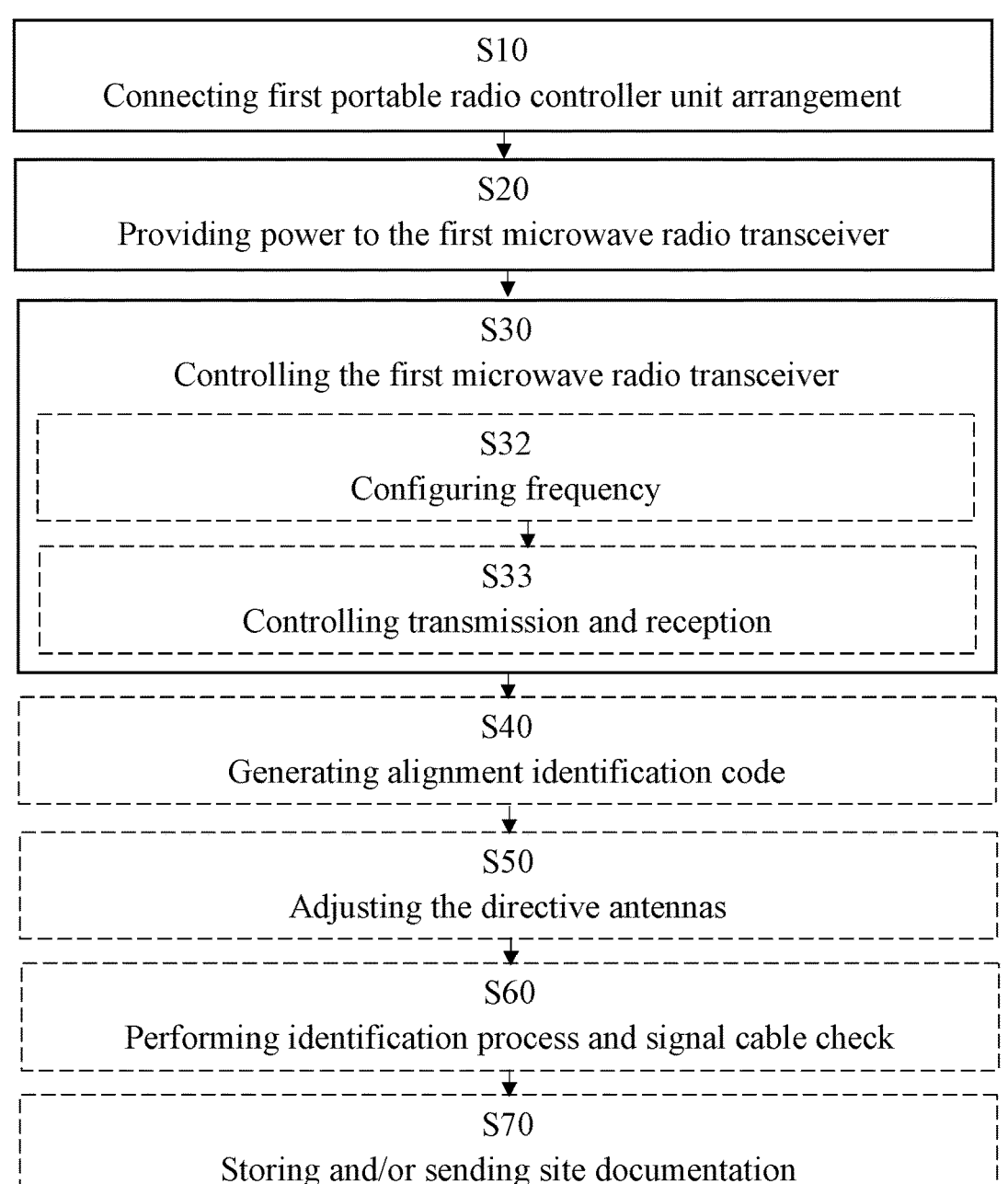

S10
Connecting first portable radio controller unit arrangement

S20
Providing power to the first microwave radio transceiver

S30
Controlling the first microwave radio transceiver

S32
Configuring frequency

S33
Controlling transmission and reception

S40
Generating alignment identification code

S50
Adjusting the directive antennas

S60
Performing identification process and signal cable check

S70
Storing and/or sending site documentation

FIG. 5

MEANS AND METHOD FOR MICROWAVE RADIO TRANSCEIVER CONTROL

PRIORITY

This nonprovisional application is a U.S. National Stage Filing under 35 U.S.C. § 371 of International Patent Application Serial No. PCT/SE2020/050063 filed Jan. 27, 2020 and entitled "MEANS AND METHOD FOR MICROWAVE RADIO TRANSCEIVER CONTROL" which are hereby incorporated by reference in their entirety.

TECHNICAL FIELD

The present disclosure relates to portable radio controller unit that is adapted to be connected to a signal cable that runs to a microwave radio transceiver that is comprised in a microwave link node.

BACKGROUND

Microwave link communication is performed between microwave link nodes positioned at different sites, where two microwave link nodes that are adapted to communicate with each other constitute a microwave link hop. A microwave link node typically comprises a mast onto which a microwave radio transceiver and a link antenna are mounted.

Alignment of a microwave link hop between two sites is normally based on manual work where at least two persons should be located at each site, one person climbing the mast while the other person is remaining at the ground. Antenna mount equipment including a mast bracket, the link antenna, the microwave radio transceiver and several tools have to be delivered to the person in the mast, for example by a rope and a pulley arrangement. The link antenna with the antenna mount is assembled on the mast; a rough alignment is done before the bracket is fixed. The microwave radio transceiver is assembled onto and connected to the link antenna, and is then activated by connecting the radio cable to the indoor equipment which provides DC power and configuration commands.

A final alignment is done by one person at each mast, for example by means of adjustment screws located in different positions on the antenna mount. When best Received Signal Strength Indication (RSSI) is found on each site, the persons in the masts tighten a number of locking screws and nuts on the respective antenna mount, and then the deployment is finished.

If re-alignment is needed, the alignment procedure is repeated for the already mounted equipment.

This process requires that indoor parts are installed and power to supply the site equipment is in function. The indoor part is adapted to configure and power the microwave radio transceiver in the mast for the alignment process. Normally there are different teams that install mast, build the shelter, install the indoor parts, install power and climb the mast.

All teams/competences for building and starting a site need to have finished their work in order to power up and configure the microwave radio transceiver for the alignment process. The work packages have internal dependencies and create long chain of activities which lead to long lead times and a need of thorough planning.

It is desired to be able to perform alignment and/or service even if the indoor unit is not yet into operation, or malfunctioning.

SUMMARY

It is an object of the present disclosure to provide enhanced means for control, alignment and/or service of a microwave link node, even if an indoor unit is not yet into operation, or malfunctioning.

This object is obtained by means of a portable radio controller unit arrangement that comprises an electrical power source that is adapted to provide power to a microwave radio transceiver that comprises a transmitter unit and a receiver unit. The microwave radio transceiver is comprised in a microwave link node and is connected to a directive antenna and to a signal cable. The radio controller unit arrangement further comprises a user interface unit which is adapted to communicate with the microwave radio transceiver such that the portable radio controller unit arrangement is adapted to enable user control of the microwave radio transceiver via the user interface unit.

This means that enhanced means for control, alignment and/or service of a microwave link node are provided, such that the microwave link node can be powered and controlled, for example for alignment or service, even if an indoor unit is not yet into operation, or malfunctioning.

According to some aspects, the portable radio controller unit arrangement is adapted to be temporarily connected to the microwave radio transceiver via the signal cable, wherein the portable radio controller unit arrangement comprises a radio connection interface and a control unit.

This means that the existing signal cable is used.

According to some aspects, the portable radio controller unit arrangement comprises a communication interface that is adapted to provide at least one communication channel to external computers and/or the Internet via Bluetooth, USB and/or NFC, 3G, 4G, 5G, Wifi or cable.

This means that an easy access to, for example, the Internet is provided which for example can be used for controlling another portable radio controller unit arrangement at another microwave link node. This can for example be useful during an alignment procedure.

According to some aspects, the communication interface comprises at least one connector, enabling wired connection for said communication channel.

According to some aspects, the communication interface comprises a first wireless transceiver, enabling wireless connection for said communication channel.

According to some aspects, the user interface unit comprises a first wireless transceiver and is adapted to communicate with an external user interface via the first wireless transceiver.

This means that user control can be performed via an external device such as a laptop or a smartphone.

According to some aspects, the portable radio controller unit arrangement is adapted to be temporarily connected to the microwave radio transceiver via a separate signal cable.

This means that a tailored signal connection can be used, and where an existing, functioning and reliable signal cable is not needed.

According to some aspects, the electrical power source is adapted to provide power to the microwave radio transceiver via the signal cable.

This means that the electrical power source can be installed at the end of the existing signal cable.

According to some aspects, the electrical power source is adapted to provide power to the microwave radio transceiver via a separate power cable.

This means that an existing, functioning and reliable signal cable is not needed.

According to some aspects, the user interface unit is adapted to communicate with the microwave radio transceiver via a separate connection that either is wired or wireless.

This means that the interface unit can be a separate unit that in itself contains all necessary functionality, such as a laptop or a smartphone.

According to some aspects, the user interface unit comprises a user interface that is accessible for a user.

This means that no separate unit is needed.

According to some aspects, the portable radio controller unit arrangement is adapted to provide a temporary alignment identification code.

This means that a user can be assured that an alignment procedure is performed between the correct microwave link nodes According to some aspects, the portable radio controller unit arrangement is adapted to control the transmitter unit such that the transmitter unit can be turned on and turned off.

According to some aspects, the portable radio controller unit arrangement is adapted to configure the microwave radio transceiver for desired Tx and Rx frequency.

According to some aspects, the portable radio controller unit arrangement is adapted to communicate with the microwave radio transceiver with radio configuration commands, where a CW, Continuous wave, signal is transmitted and/or received and detected.

This means that necessary control of the microwave radio transceiver is enabled.

According to some aspects, the portable radio controller unit arrangement is adapted to communicate with the microwave radio transceiver with radio configuration commands which comprise instructions for the transmitter unit to convert a first IF, Intermediate Frequency, signal to a first RF, Radio Frequency, signal to be transmitted, and for the receiver unit to convert a received second RF signal to a second IF signal.

According to some aspects, the radio controller unit arrangement is adapted to generate the first IF signal.

This means that the radio controller unit arrangement controls the IF signal and its properties, and the microwave radio transceiver does not need to generate the IF signal.

According to some aspects, the radio controller unit arrangement is adapted to receive the second IF signal and to determine at least one signal parameter related to the strength of the second IF signal.

This means that the radio controller unit arrangement is enabled to perform a cable check.

According to some aspects, the radio configuration commands comprises instructions for the microwave radio transceiver to generate the first RF signal.

This means that the microwave radio transceiver is responsible for generating the first RF signal.

According to some aspects, the portable radio controller unit arrangement is adapted to receive at least one signal parameter related to the strength of the second RF signal, where said signal parameter has been determined by the microwave radio transceiver.

This means that the radio controller unit arrangement is able to determine the strength of the second RF signal, i.e. the received RF signal.

According to some aspects, the electrical power source is constituted by a rechargeable battery.

This means that the electrical power source can be constituted by a standard rechargeable component.

This object is also obtained by means of methods that are associated with the above advantages.

BRIEF DESCRIPTION OF THE DRAWINGS

The present disclosure will now be described more in detail with reference to the appended drawings, where:

FIG. 5 shows flowcharts of methods according to embodiments.

DETAILED DESCRIPTION

Figure 1:
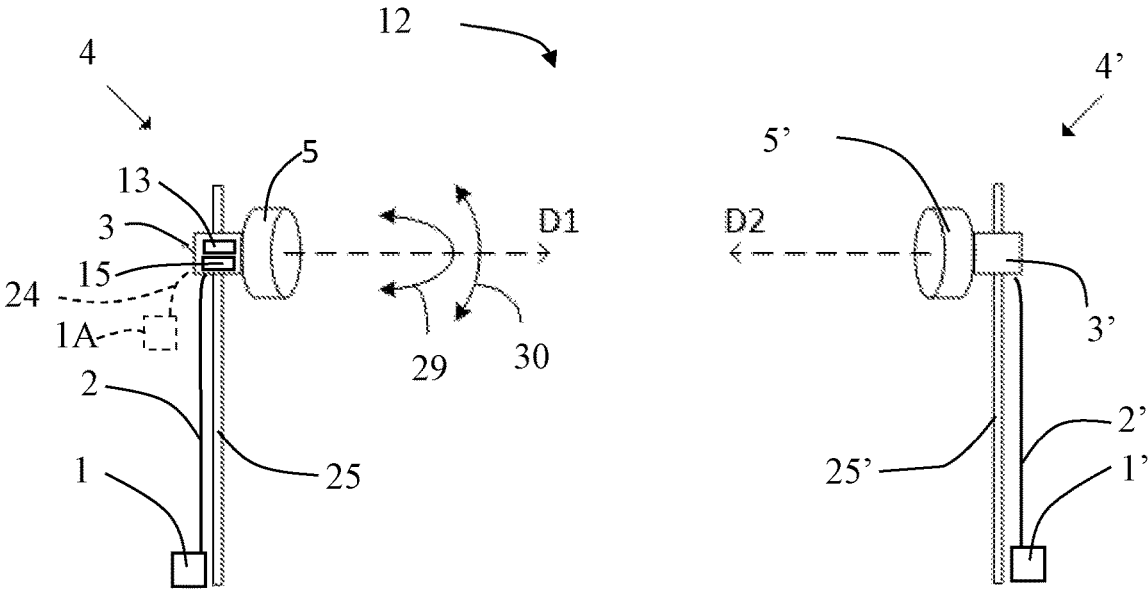
FIG. 1 schematically shows two microwave link nodes, illustrating a first example and a second example.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, there is a first microwave link node 4 and a second microwave link node 4' comprised in a communication system 12. The first microwave link node 4 comprises a first directive antenna 5, a first microwave radio transceiver 3 that is connected to the first directive antenna 5, and a first signal cable 2 that runs from the first microwave radio transceiver 3. The first microwave link node 4 also comprises a first mast 25 onto which the first directive antenna 5 and the first microwave radio transceiver 3 are attached.

Correspondingly, the second microwave link node 4' comprises a second directive antenna 5', a second microwave radio transceiver 3' that is connected to the second directive antenna 5', and a second signal cable 2' that runs from the first microwave radio transceiver 3'. The second microwave link node 4' also comprises a second mast 25' onto which the second directive antenna 5' and the second microwave radio transceiver 3' are attached.

Figure 3:
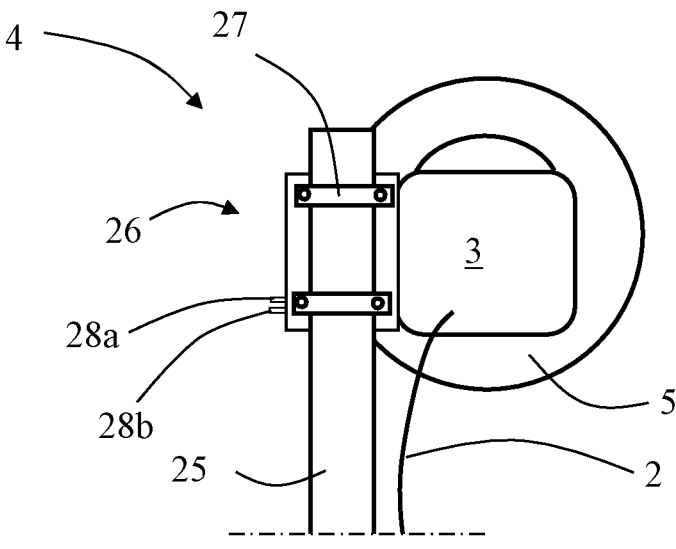
FIG. 3 schematically shows a view of a microwave link node.

According to some aspects, as shown for the first microwave link node 4 in FIG. 3, each microwave link node 4' comprises a corresponding alignment device 26 that comprises mounting brackets 27 and adjustment screws 28a, 28b located in different positions. By rotating these screws 28a, 28b, the alignment of the corresponding antenna 5 is affected in a previously well-known manner. For example, there is an azimuth adjustment screw 28a that is adapted to adjust the first directive antenna 5 in an azimuth direction 29 and an elevation adjustment screw 28b that is adapted to adjust the first directive antenna 5 in an elevation direction 30.

Other types of alignment arrangements and procedures are of course possible, for example rotating the antenna fixture on the mast. Alignment can also be performed by means of electrical servo motors or step-motors. Each alignment is performed until a satisfactory alignment result has been obtained.

Figure 2:
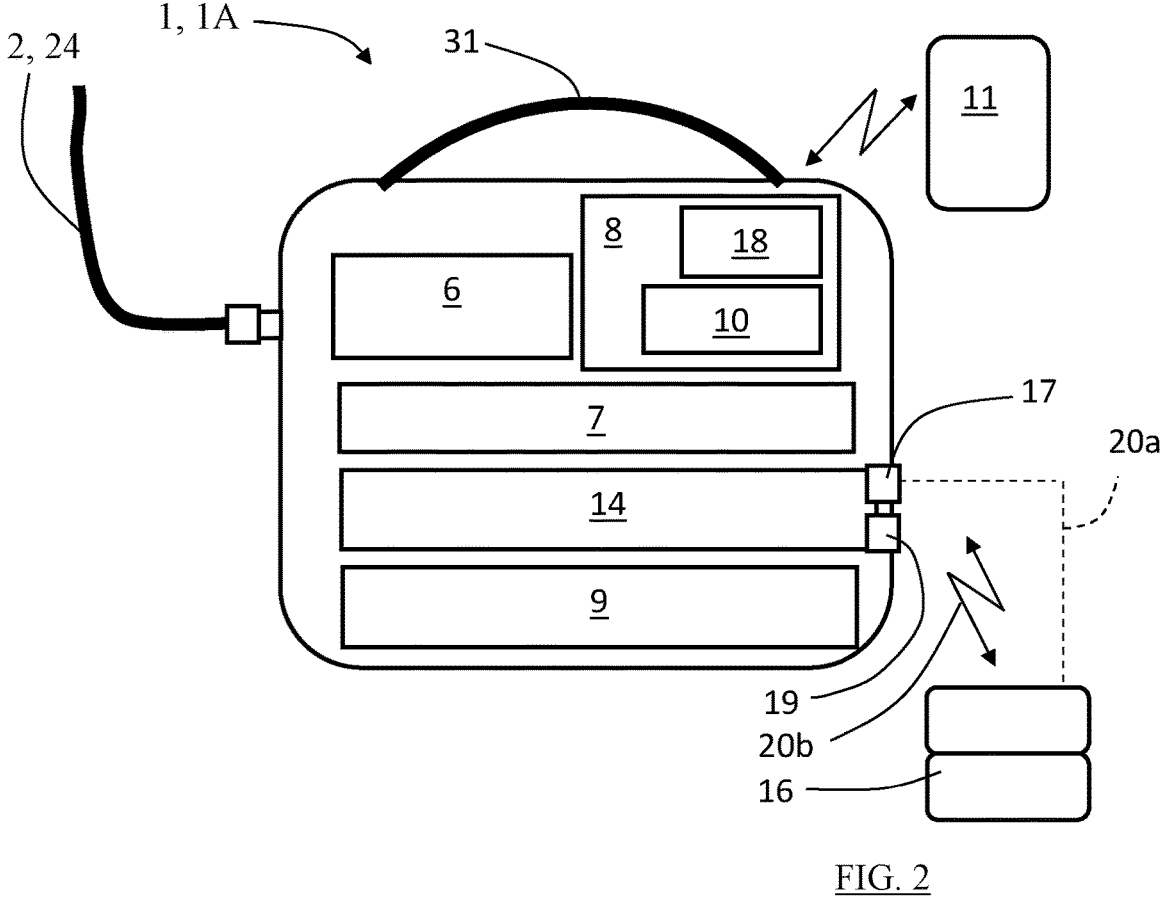
FIG. 2 schematically shows a portable radio controller unit.

In the following the first microwave link node 4 will be used for the further discussions with reference to FIG. 1, FIG. 2 and FIG. 3 showing a first example of a portable radio controller unit arrangement 1 according to the present disclosure. The radio controller unit arrangement 1 comprises a carrying handle 31, a radio connection interface 6, a control unit 7 and an electrical power source 9, and is adapted to be temporarily connected to the microwave radio transceiver 3 via the signal cable 2. The radio controller unit arrangement 1 further comprises a user interface unit 8 which is adapted to communicate with the microwave radio transceiver 3 such that the portable radio controller unit arrangement 1 is adapted to enable user control of the microwave radio transceiver 3 via the user interface unit 8.

This means that the radio controller unit arrangement 1 is adapted to temporarily provide both power and control for the microwave radio transceiver 3. This means that the microwave link node 4 can be tested and aligned without the need of the site being complete, for example an indoor unit that is adapted to configure and power the microwave radio transceiver 3 is not needed.

Furthermore, when an existing indoor unit is malfunctioning, the radio controller unit arrangement 1 can be used for running the microwave radio transceiver 3.

The radio controller unit arrangement 1 thus provides the possibility to align the radio link hop without full infrastructure installed. A mast climbing team can first install the antenna 5, the microwave radio transceiver 3 and the signal cable 2 in the mast 25, and then directly perform alignment and secure performance of the microwave link node 4 without the need of indoor parts or power to the site. It gives the possibility to decide more freely when the mast climbing team shall do their job and removes the chain of work packages which need to be finalized in the current installation sequence.

The user interface unit 8 comprises a user interface 10 that is accessible for a user and is an integrated part of the radio controller unit arrangement 1. Alternatively, or in combination, the interface unit 8 comprises a first wireless transceiver 18 and is adapted to communicate with an external user interface 11 via the first wireless transceiver 18. In the latter case, the control of the microwave radio transceiver 3 can for example be performed via a laptop or a smartphone that communicates with the interface unit 8. In this way, an operator that performs an alignment in the mast 25 can control the radio controller unit arrangement 1 that can be positioned elsewhere, for example at the bottom of the mast 25.

According to some aspects, the portable radio controller unit arrangement 1 comprises a communication interface 14 that is adapted to provide communication channels 20a, 20b to external computers 16 and/or the Internet via Bluetooth, USB and/or NFC, 3G, 4G, 5G, Wifi or cable. Here, the communication interface 14 comprises a connector 17 and a second wireless transceiver 19, where the connector 17 enables a wired connection for the communication channel 20a and the second wireless transceiver 19 enables wireless connection for the communication channel 20b.

According to some aspects, the portable radio controller unit arrangement 1 is adapted to control a transmitter unit 13 and a receiver unit 15 which units 13, 15 are comprised in the microwave radio transceiver 3.

According to some aspects, the portable radio controller unit arrangement 1 is adapted to communicate with the microwave radio transceiver 3 with radio configuration commands adapted to configure the transmitter unit 13 and the receiver unit 15 to correct Rx and Tx frequency for alignment. The radio configuration commands are further adapted to configure the transmitter unit 13 to turn on output power and send a CW, Continuous wave, signal on the correct frequency for alignment, and the receiver unit 15 for reading the received strength indicator (RSSI) during the alignment process.

According to some aspects, the portable radio controller unit arrangement 1 is adapted to generate an IF, Intermediate Frequency, signal to be transmitted by the transmitter unit 13 after being converted to an RF, radio frequency, signal. The portable radio controller unit is further adapted to detect a signal strength level of a received RF signal, received by the receiver unit 15.

According to some aspects, the portable radio controller unit arrangement 1 is adapted to generate and send an IF signal to the transmitter unit 13 via the signal cable 2, and according to some further aspects, the portable radio controller unit arrangement 1 is adapted to receive an IF signal from the receiver unit 15 via the signal cable 2.

According to some aspects, the transmitter unit 13 is adapted to convert an IF signal to an RF signal, and according to some further aspects, the receiver unit 15 is adapted to convert an RF signal to an IF signal. This means that in the case of the radio controller unit arrangement 1 generating and sending an IF signal to the microwave radio transceiver 3, the transmitter unit 13 is adapted to convert the IF signal to an RF signal to be transmitted via the first directive antenna 5. Furthermore, the receiver unit 15 is adapted to convert an RF signal received via the first directive antenna 5 to an IF signal that is forwarded to the radio controller unit arrangement 1.

Generally, the portable radio controller unit arrangement 1 is adapted to communicate with the microwave radio transceiver 3 with radio configuration commands which comprise instructions for the transmitter unit 13 to convert a first IF signal to a first RF signal to be transmitted, and for the receiver unit 15 to convert a received second RF signal which has been received via the first directive antenna 5 to a second IF signal.

According to some aspects, the radio controller unit arrangement 1 is then adapted to determine RSSI based on the received RF signal and by sending radio commands to the microwave radio transceiver 3.

According to some aspects, the microwave radio transceiver 3 is configured by the portable radio controller unit arrangement 1 to loop a received IF signal back to the radio controller unit arrangement 1 via the signal cable 2 to do a verification of signal quality of signal cable 2, a signal cable check, and the microwave radio transceiver 3. In that case, the radio controller unit arrangement 1 is adapted to determine RSSI for the received IF signal, the second IF signal.

According to some aspects, the portable radio controller unit arrangement 1 is adapted to provide a temporary alignment identification code. This means that when the first microwave link node 4 communicates with the second microwave link node 4', a certain data sequence that constitutes the temporary alignment identification code is generated. This data sequence is either transmitted all the time or at certain times on a regular basis together with the CW signal. According to some aspects, the temporary alignment identification code is only transmitted when an alignment has been accomplished, as a final check.

On the receiving end, receiving a correct alignment identification code ensures that the received signal is generated at the correct microwave link node such that alignment is performed for the correct microwave link nodes.

The microwave radio transceivers 3, 3' have functions to generate and send CW signal as well as detecting received power, and these functions can be used to generate a code by on/off or high/low power signaling. If for example the code consists of a 2 Byte word, an example can be:

[startByte, CodeByte1, CodeByte2, EndByte].

A "one" bit corresponds to the CW being turned on or at a high power mode, and a "zero" bit corresponds to the CW being turned off or at a low power mode.

The duration of each bit needs to be slow enough for the Tx not to violate the spectrum mask requirements. It also needs to be slow enough so that the RSSI circuit can detect the variation in received power.

For example, if the first microwave link node 4 is to be aligned with the second microwave link node 4', each directive antenna 5, 5' is coarsely aligned towards the other site of the hop in a corresponding direction D1, D2, for example by means of a compass. A first radio controller unit arrangement 1 is connected to the signal cable 2 of the first microwave link node 4, and a corresponding second radio controller unit arrangement 1' is connected to the signal cable 2' of the second microwave link node 4'. The radio controller unit arrangements 1, 1' are of the kind previously described for the first microwave link node 4. The radio controller unit arrangements 1, 1' can of course be of any suitable kind, for examples as described in the examples following below.

An operator at each microwave link node 4, 4' activates the corresponding radio controller unit arrangement 1, 1', and an alignment procedure can take place, starting with an alignment identification code being configured in the two radio controller unit arrangements 1, 1'. This is only used temporary to secure that the alignment is towards the correct microwave radio transceiver at the other side.

The correct frequency is configured and the first radio controller unit arrangement 1 controls the first microwave radio transceiver 3 to transmit signals towards the second microwave link node 4', and the second radio controller unit arrangement 1' controls the second microwave radio transceiver 3' to receive signals from the first microwave link node 4, and the second radio controller unit arrangement 1' controls the second microwave radio transceiver 3' to transmit signals to the first microwave link node 4, and the first radio controller unit arrangement 1 controls the first transceiver 3 to receive signals from the second microwave link node 4'.

An operator at each microwave link node 4, 4' is then able to detect a received signal strength in a previously well-known manner in order to perform alignment by adjusting the directive antennas 5, 5' such that desired alignment measures are obtained. By means of the correct alignment identification code, it is ensured that the alignment is performed between the first microwave link node 4 and the second microwave link node 4'.

According to some aspects, when the alignment is satisfactory, i.e. when desired alignment measures are obtained, an identification process and signal cable check can be done and the site documentation can be stored and/or sent to another device. The identification process can be done as described above where a temporary alignment identification code is only transmitted, for example when an alignment has been accomplished, as a final check. The signal cable check can for example be performed as described above a signal from the radio controller unit arrangement 1 is looped back to the radio controller unit arrangement 1 via the signal cable 2.

As mentioned above, transmission and reception can be made simultaneously at the microwave link nodes 4, 4'; according to some aspects, alternation between transmission and reception can instead be made with a relatively short period time preferably automatically.

According to some aspects, an operator can be able to control both radio controller units 1, 1', for example by means of an Internet connection that is available via the communication interface 14.

According to some aspects, the electrical power source 9 is constituted by a rechargeable battery. According to a second example, corresponding to the first example and illustrated with dashed lines in FIG. 1, the radio controller unit arrangement 1A is not connected to the microwave radio transceiver 3 via the signal cable 3, but via a separate cable 24 that for example can be a USB, Universal Serial Bus, cable. In this way, an operator that performs an alignment in the mast 25 can have access to the radio controller unit arrangement 1A.

Figure 4:
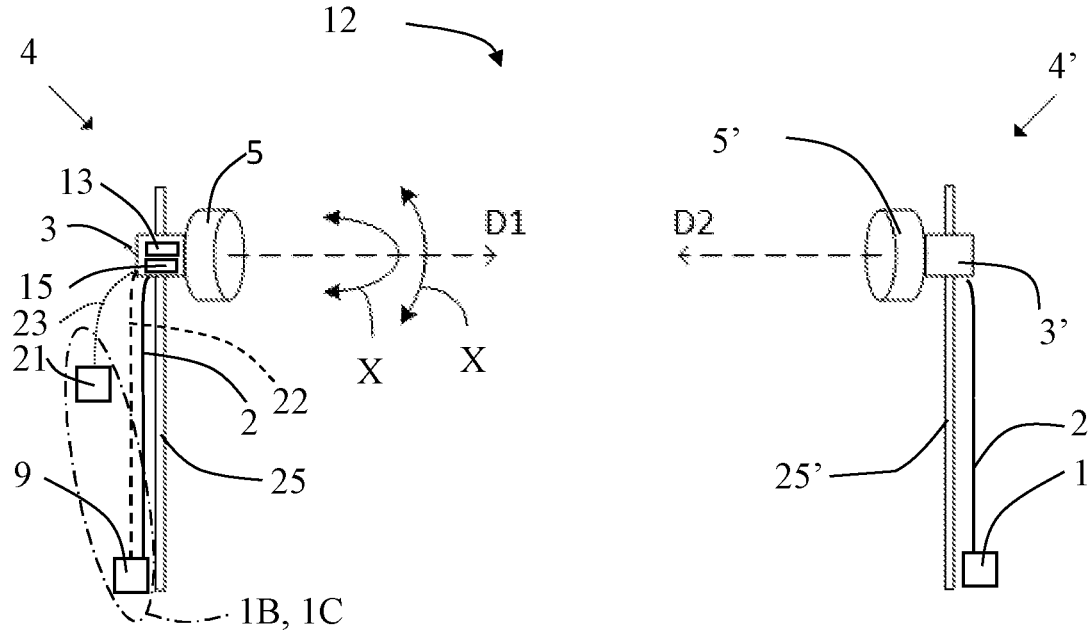
FIG. 4 schematically shows two microwave link nodes, illustrating a third example and a fourth example.

According to a third example with reference to FIG. 4, the wherein the portable radio controller unit arrangement 1B comprises an electrical power source 9 and a user interface 21, where the electrical power source 9 is adapted to provide power to the microwave radio transceiver 3 via the signal cable 2 as in the first example. Here, however, the user interface unit 21 is separate from the electrical power source 9 and is adapted to communicate with the microwave radio transceiver 3 via a separate connection 23 that either is wired or wireless.

According to a fourth example, corresponding to the third example and illustrated with dashed lines in FIG. 4, the portable radio controller unit arrangement 1C comprises an electrical power source 9 that is adapted to provide power to the microwave radio transceiver 3 via a separate power cable 22, not via the signal cable 9. This can be advantageous if the signal cable 9 is not yet available, or already connected to an indoor unit or similar that not yet is operational.

For the third example and the fourth example, the portable radio controller unit arrangement 1B, 1C comprises an electrical power source 9 that is adapted to provide power to a microwave radio transceiver 3 and a user interface unit 21 which is adapted to communicate with the microwave radio transceiver 3. The user interface unit 21 can in this case for example be in the form of a laptop or a smartphone, where the user interface unit 21 in this case comprises all necessary software and hardware for controlling the microwave radio transceiver 3 and for detecting received signal strength.

The first example and second example have been described with a portable radio controller unit arrangement that is adapted for generation and reception of an IF signal, a first IF signal, as well as detection of RSSI for the received RF signal by sending radio commands to the microwave radio transceiver 3. This can be the case for the third example and the fourth example as well, assuming that the separate connection 23 is adapted to handle IF signals.

Alternatively, for all examples, the portable radio controller unit arrangement 1, 1A, 1B, 1C does not provide an IF signal to the microwave radio transceiver 3, and is not adapted to receive an IF signal from the microwave radio transceiver 3. The portable radio controller unit arrangement 1, 1A, 1B, 1C is used for sending control commands to the microwave radio transceiver 3 for generating and transmitting and an RF signal, a first RF signal, via the directive antenna 5. The microwave radio transceiver 3 is further adapted for detecting RSSI for the received RF signal, the second RF signal, and to communicate the result to the radio controller unit arrangement 1, 1A, 1B, 1C.

These alternatives are of course applicable for any conceivable radio controller unit arrangement according to the present disclosure, and any suitable combination of features and functionalities is of course possible.

According to the present disclosure:

Installation and alignment of radio link radios in the mast can be done without any indoor parts present at the site.

Power is not needed at the site during the alignment process. There is no dependence of time and functionality of other work activities for building a site.

The performance of the mast installed equipment can be verified.

The correct radio on the other side of a radio link hop can be identified to secure correct alignment.

With reference to FIG. 5, the present disclosure also relates to a method for controlling a first microwave link node 4. The method comprises connecting S10 a first portable radio controller unit arrangement 1, 1A, 1B, 1C to a first microwave radio transceiver 3 that is used in a first microwave link node 4 and is connected to a first directive antenna 5. The method further comprises providing S20 power to the first microwave radio transceiver 3 using an electrical power source 9 comprised in the first portable radio controller unit arrangement 1, 1A, 1B, 1C, and controlling S30 the first microwave radio transceiver 3 using an interface unit 8 comprised in the first portable radio controller unit arrangement 1, 1A, 1B, 1C.

This means that the first portable radio controller unit arrangement 1, 1A, 1B, 1C can be used for controlling the first microwave radio transceiver 3 without the need of infrastructure such as an indoor unit. The control can for example be used for alignment, function control and repair.

According to some aspects, the method relates to aligning a first directive antenna 5 comprised in the first microwave link node 4 in a direction D1 towards a second directive antenna 5' comprised in a second microwave link node 4'. The method then comprises using the portable radio controller unit arrangement 1 for generating S40 an alignment identification code to be used temporary for securing that the alignment is performed between the correct microwave link nodes 4, 4', configuring S32 the Rx and Tx frequency to be used, and controlling S33 the microwave radio transceiver 3 to transmit and to receive signals from the second microwave link node 4'. The method further comprises adjusting S50 the directive antennas 5 such that desired alignment measures are obtained.

If the second microwave link node 4' already comprises an indoor unit, there is only the need of one portable radio controller unit arrangement that is used at the first microwave link node 4 that lacks an indoor unit and therefore requires the radio controller unit arrangement 1, 1A, 1B, 1C according to the present disclosure.

Should the second microwave link node 4' also lack an indoor unit and therefore require a radio controller unit arrangement 1', the method is repeated for the second microwave link node 4' as well, using a second portable radio controller unit arrangement 1'.

According to some aspects, when the desired alignment measures are obtained, the method further comprises using the portable radio controller unit arrangement 1 for performing S60 identification process and signal cable check, and for storing and/or sending S70 site documentation to another device.

According to some aspects, the method further comprises using the portable radio controller unit arrangement 1 for communicating with the microwave radio transceiver 3 using radio configuration commands with instructions for the transmitter unit 13 to convert a first IF, Intermediate Frequency, signal to a first RF, Radio Frequency, signal to be transmitted, and for the receiver unit 15 to convert a received second RF signal to a second IF signal.

According to some aspects, the method comprises using the portable radio controller unit arrangement 1 for generating the first IF signal.

According to some aspects, the method further comprises using the portable radio controller unit arrangement 1 for receiving the second IF signal and for determining at least one signal parameter related to the strength of the second IF signal for the cable check.

According to some aspects, the method comprises using the portable radio controller unit arrangement 1 for instructing the microwave radio transceiver 3 to generate the first RF signal.

According to some aspects, the method comprises using the portable radio controller unit arrangement 1 for receiving at least one signal parameter related to the strength of the second RF signal, where said signal parameter has been determined by the microwave radio transceiver 3.

The present disclosure is not limited to the above, but may vary freely within the scope of the appended claims. For example, according to some aspects, all examples and procedures described, such as the alignment procedure, are applicable for all examples where possible.

It is to be noted that in the drawings, the second example, the third example and the fourth example are only illustrated for the first microwave link node 4, any one of these examples can of course be applied for the second microwave link node 4' as well as any other microwave link node.

The portable radio controller unit arrangement 1, 1A, 1B, 1C can be used for alignment of two microwave link nodes as well as function control and repair of one or more microwave link nodes.

The portable radio controller unit arrangement can thus be composed in many different ways, for example as an integrated unit as shown for the first example and the second example, or as a unit with separate parts as shown for the third example and the fourth example.

Even if the radio controller unit arrangement is an integrated unit, not all parts described are necessary. For all examples, the portable radio controller unit arrangement 1, 1A, 1B, 1C at least comprises an electrical power source 9 that is adapted to provide power to a microwave radio transceiver 3 and a user interface unit 8, 21 which is adapted to communicate with the microwave radio transceiver 3. The user interface unit 8, 21 can either be equipped with necessary software and hardware for controlling the microwave radio transceiver 3 and for detecting received signal strength, or only with necessary functionality for allowing communication with the microwave radio transceiver 3, where further functionality can be comprised in a separate control unit 7 and/or a radio connection interface 6.

As mentioned previously, there can be an optional communication interface 14 that is adapted to provide at least one communication channel 20a, 20b to external computers 16 and/or the Internet. This can for example enable a user to control two or more portable radio controller unit arrangements at different sites.

According to some aspects, in the case of alignment being performed by means of electrical servo motors or stepmotors, these motors can be controlled by the portable radio controller unit arrangement 1, 1A, 1B, 1C such that an more or less automatic alignment can be performed, without the need of a person in the mast.

Generally, the present disclosure relates to a portable radio controller unit arrangement 1, 1A, 1B, 1C that comprises an electrical power source 9 that is adapted to provide power to a microwave radio transceiver 3 that comprises a transmitter unit 13 and a receiver unit 15. The microwave radio transceiver 3 is comprised in a microwave link node 4 and is connected to a directive antenna 5 and to a signal cable 2. The radio controller unit arrangement 1 further comprises a user interface unit 8, 21 which is adapted to communicate with the microwave radio transceiver 3 such that the portable radio controller unit arrangement 1, 1A, 1B, 1C is adapted to enable user control of the microwave radio transceiver 3 via the user interface unit 8.

According to some aspects, the portable radio controller unit arrangement 1 is adapted to be temporarily connected to the microwave radio transceiver 3 via the signal cable 2, wherein the portable radio controller unit arrangement 1 comprises a radio connection interface 6 and a control unit 7.

According to some aspects, the portable radio controller unit arrangement 1 comprises a communication interface 14 that is adapted to provide at least one communication channel 20a, 20b to external computers 16 and/or the Internet via Bluetooth, USB and/or NFC, 3G, 4G, 5G, Wifi or cable.

According to some aspects, the communication interface 14 comprises at least one connector 17, enabling wired connection for said communication channel 20a.

According to some aspects, the communication interface 14 comprises a first wireless transceiver 19, enabling wireless connection for said communication channel 20b.

According to some aspects, the user interface unit 8 comprises a first wireless transceiver 18 and is adapted to communicate with an external user interface 11 via the first wireless transceiver 18.

According to some aspects, the portable radio controller unit arrangement 1A is adapted to be temporarily connected to the microwave radio transceiver 3 via a separate signal cable 24.

According to some aspects, the electrical power source 9 is adapted to provide power to the microwave radio transceiver 3 via the signal cable 2.

According to some aspects, the electrical power source 9 is adapted to provide power to the microwave radio transceiver 3 via a separate power cable 22.

According to some aspects, the user interface unit 21 is adapted to communicate with the microwave radio transceiver 3 via a separate connection 23 that either is wired or wireless.

According to some aspects, the user interface unit 8, 21 comprises a user interface 10 that is accessible for a user.

According to some aspects, the portable radio controller unit arrangement 1 is adapted to provide a temporary alignment identification code.

According to some aspects, the portable radio controller unit arrangement 1 is adapted to control the transmitter unit 13 such that the transmitter unit 13 can be turned on and turned off.

According to some aspects, the portable radio controller unit arrangement 1 is adapted to configure the microwave radio transceiver 3 for desired Tx and Rx frequency.

According to some aspects, the portable radio controller unit arrangement 1 is adapted to communicate with the microwave radio transceiver 3 with radio configuration commands, where a CW, Continuous wave, signal is transmitted and/or received and detected.

According to some aspects, the portable radio controller unit arrangement 1, 1A, 1B, 1C is adapted to communicate with the microwave radio transceiver 3 with radio configuration commands which comprise instructions for the transmitter unit 13 to convert a first IF, Intermediate Frequency, signal to a first RF, Radio Frequency, signal to be transmitted, and for the receiver unit 15 to convert a received second RF signal to a second IF signal.

According to some aspects, the radio controller unit arrangement 1, 1A, 1B, 1C is adapted to generate the first IF signal.

According to some aspects, the radio controller unit arrangement 1, 1A, 1B, 1C is adapted to receive the second IF signal and to determine at least one signal parameter related to the strength of the second IF signal.

According to some aspects, the radio configuration commands comprises instructions for the microwave radio transceiver 3 to generate the first RF signal.

According to some aspects, the portable radio controller unit arrangement 1, 1A, 1B, 1C is adapted to receive at least one signal parameter related to the strength of the second RF signal, where said signal parameter has been determined by the microwave radio transceiver 3.

According to some aspects, the electrical power source 9 is constituted by a rechargeable battery.

The present disclosure also relates to a method for controlling a first microwave link node as described above.

The invention claimed is:

1. A portable radio controller unit arrangement that comprises an electrical power source that is adapted to provide power to a microwave radio transceiver that comprises a transmitter unit and a receiver unit, where the microwave radio transceiver is comprised in a microwave link node and is connected to a directive antenna and to a signal cable, wherein the radio controller unit arrangement further comprises a user interface unit which is adapted to communicate with the microwave radio transceiver such that the portable radio controller unit arrangement is adapted to enable user control of the microwave radio transceiver via the user interface unit.

2. The portable radio controller unit arrangement according to claim 1, wherein the portable radio controller unit arrangement is adapted to be temporarily connected to the microwave radio transceiver via the signal cable, wherein the portable radio controller unit arrangement comprises a radio connection interface and a control unit.

3. The portable radio controller unit arrangement according to claim 1, wherein the portable radio controller unit arrangement comprises a communication interface that is adapted to provide at least one communication channel to external computers and/or the Internet via Bluetooth, USB and/or NFC, 3G, 4G, 5G, Wifi or cable.

4. The portable radio controller unit arrangement according to claim 3, wherein the communication interface comprises at least one connector, enabling wired connection for said communication channel.

5. The portable radio controller unit arrangement according to claim 3, wherein the communication interface comprises a first wireless transceiver, enabling wireless connection for said communication channel.

6. The portable radio controller unit arrangement according to claim 1, wherein the user interface unit comprises a first wireless transceiver and is adapted to communicate with an external user interface via the first wireless transceiver.

7. The portable radio controller unit arrangement according to claim 1, wherein the portable radio controller unit arrangement is adapted to be temporarily connected to the microwave radio transceiver via a separate signal cable.

8. The portable radio controller unit arrangement according to claim 1, wherein the electrical power source is adapted to provide power to the microwave radio transceiver via the signal cable.

9. The portable radio controller unit arrangement according to claim 8, wherein the user interface unit is adapted to communicate with the microwave radio transceiver via a separate connection that either is wired or wireless.

10. The portable radio controller unit arrangement according to claim 1, wherein the electrical power source is adapted to provide power to the microwave radio transceiver via a separate power cable.

11. The portable radio controller unit arrangement according to claim 1, wherein the user interface unit comprises a user interface that is accessible for a user.

12. The portable radio controller unit arrangement according to claim 1, wherein the portable radio controller unit arrangement is adapted to provide a temporary alignment identification code.

13. The portable radio controller unit arrangement according to claim 1, wherein the portable radio controller unit arrangement is adapted to control the transmitter unit such that the transmitter unit can be turned on and turned off.

14. The portable radio controller unit arrangement according to claim 1, wherein the portable radio controller unit arrangement is adapted to configure the microwave radio transceiver for desired Tx and Rx frequency.

15. The portable radio controller unit arrangement according to claim 1, wherein the portable radio controller unit arrangement is adapted to communicate with the microwave radio transceiver with radio configuration commands, where a continuous wave (CW) signal is transmitted or received and detected.

16. The portable radio controller unit arrangement according to claim 1, wherein the portable radio controller unit arrangement is adapted to communicate with the microwave radio transceiver with radio configuration commands which comprise instructions for the transmitter unit to convert a first intermediate frequency (IF) signal to a first radio frequency (RF) signal to be transmitted, and for the receiver unit to convert a received second RF signal to a second IF signal.

17. The portable radio controller unit arrangement according to claim 16, wherein the radio controller unit arrangement is adapted to generate the first IF signal.

18. The portable radio controller unit arrangement according to claim 16, wherein the radio controller unit arrangement is adapted to receive the second IF signal and to determine at least one signal parameter related to the strength of the second IF signal.

19. The portable radio controller unit arrangement according to claim 16, wherein the radio configuration commands comprises instructions for the microwave radio transceiver to generate the first RF signal.

20. The portable radio controller unit arrangement according to claim 16, wherein the portable radio controller unit arrangement is adapted to receive at least one signal parameter related to the strength of the second RF signal, where said signal parameter has been determined by the microwave radio transceiver.

21. The portable radio controller unit arrangement according to claim 1, wherein the electrical power source is constituted by a rechargeable battery.

22. A method for controlling a first microwave link node, the method comprising:

connecting a first portable radio controller unit arrangement to a first microwave radio transceiver that is used in a first microwave link node and is connected to a first directive antenna;

providing power to the first microwave radio transceiver using an electrical power source comprised in the first portable radio controller unit arrangement; and controlling the first microwave radio transceiver using an interface unit comprised in the first portable radio controller unit arrangement.

23. The method according to claim 22, further comprising aligning a first directive antenna comprised in the first microwave link node in a direction towards a second directive antenna comprised in a second microwave link node, the method comprising using the portable radio controller unit arrangement for:

generating an alignment identification code to be used temporary for securing that the alignment is performed between the correct microwave link nodes;

configuring the Rx and Tx frequency to be used; and controlling the microwave radio transceiver to transmit and to receive signals from the second microwave link node; where the method further comprises adjusting the directive antennas such that desired alignment measures are obtained.

24. The method according to claim 23, where, when the desired alignment measures are obtained, the method further comprises using the portable radio controller unit arrangement for:

performing identification process and signal cable check;

storing and/or sending site documentation to another device.

25. The method according to claim 22, where the method further comprises using the portable radio controller unit arrangement for communicating with the microwave radio transceiver using radio configuration commands with instructions for the transmitter unit to convert a first IF, Intermediate Frequency, signal to a first RF, Radio Frequency, signal to be transmitted, and for the receiver unit to convert a received second RF signal to a second IF signal.

26. The method according to claim 25, wherein the method comprises using the portable radio controller unit arrangement for generating the first IF signal.

* * * * *